United States Patent Office 2,857,339
Patented Oct. 21, 1958

2,857,339

STEEPING METHOD FOR PREPARING FOAMABLE STYRENE POLYMER PARTICLES CONTAINING RUBBERY ISOBUTYLENE POLYMER

Robert E. Colwell, Springfield, Mass., assignor to Monsanto Chemical Company, St. Louis, Mo., a corporation of Delaware No Drawing. Application December 28, 1955
Serial No. 555,759

4 Claims. (Cl. 260—2.5)

The present invention relates to a method for preparing foamable styrene polymer particles. More particularly, the present invention relates to an improved process for preparing foamable styrene polymer particles by steeping styrene polymer particles in a volatile aliphatic hydrocarbon.

Styrene polymer foams constitute a valuable class of materials which are finding increasingly wide application in the fabrication of numerous industrial and consumer articles such as life belts, insulation partitions, novelties, etc. A leading method for fabricating such foams involves placing small particles of a foamable styrene polymer in a mold and heating to foam the styrene polymer particles which fuse together to form a unitary structure. One method for preparing foamable styrene polymer particles comprises steeping styrene polymer particles in a volatile aliphatic hydrocarbon such as pentane, petroleum ethers, etc. until the styrene polymer particles have absorbed the desired quantity of the hydrocarbon, e. g., 5–10 weight percent. This process is extremely time consuming and up to 30 days may be required to absorb a sufficient quantity of the volatile aliphatic hydrocarbon, cf. Example 5 of U. S. 2,681,321. Moreover, the styrene polymer foams prepared from such foamable styrene polymer particles frequently are not as homogeneous as desired and may have an undersirably large cell size.

It is an object of this invention to provide an improved method for incorporating a volatile aliphatic hydrocarbon in styrene polymer particles.

Another object of this invention is to provide novel foamable styrene polymer particles having a volatile aliphatic hydrocarbon homogeneously incorporated therein.

Other objects and advantages of this invention will become apparent from the following detailed description thereof.

In accordance with the present invention, foamable styrene polymer particles are prepared by incorporating from about 1 part to about 20 parts of a rubbery isobutylene polymer in 100 parts of a styrene polymer, comminuting the polymer composition into small particles and steeping said particles in a volatile aliphatic hydrocarbon boiling in the range of from about 10° C. to about 80° C. The rubbery isobutylene polymer incorporated in the styrene polymer is selected from the class consisting of homopolymers of isobutylene and interpolymers of isobutylene with up to 10 weight percent of a conjugated 1,3 diene. Surprisingly, the styrene polymer particles containing small quantities of such rubbery isobutylene polymers will absorb the volatile aliphatic hydrocarbon materially faster than will particles of an unmodified styrene polymer. Moreover, the styrene polymer foams prepared from the foamable styrene polymer particles of this invention are more homogeneous and have superior physical properties to styrene polymer foams that are prepared from comparable foamable styrene particles which do not contain a rubbery isobutylene polymer.

The following examples are set forth to illustrate more clearly the principle and practice of this invention to those skilled in the art.

EXAMPLE I

*Part A*

A polystyrene having a molecular weight of approximately 65,000 is extruded into strands which are ground to a particle size of 8–20 mesh.

*Part B*

One hundred parts of the polystyrene of Part A is admixed with 5 parts of a rubbery polyisobutylene homopolymer sold under the trade name "Vistanex." The polymers are homogeneously blended by passing them through an extruder. The extruded strands are ground to a particle size of 8–20 mesh.

*Part C*

The ground polymers of Parts A and B are steeped in n-pentane at 25° C. under agitation for 24 hours. The polymer of Part B absorbs more than twice as much pentane as does the polymer of Part A.

EXAMPLE II

*Part A*

Five parts of Butyl rubber (an interpolymer of approximately 95% isobutylene and 5% isoprene) is dissolved in 100 parts of monomeric styrene together with 0.1 part ditertiary butyl peroxide. The resulting solution is polymerized by heating for 14 hours at 75° C. and another 14 hours while increasing the temperature from 75° C. to 190° C.

*Part B*

A polystyrene is prepared as described in Part A above except that no Butyl rubber is added to the monomeric styrene.

*Part C*

The polymers from Parts A and B are ground to 8–20 mesh and steeped in n-pentane at 25° C. for 24 hours. The polymer from Part A containing the Butyl rubber picks up and absorbs pentane at a rate twice as fast as does the unmodified polystyrene of Part B.

The rubbery isobutylene polymer incorporated in the styrene polymer is selected from the group consisting of homopolymers of isobutylene and interpolymers of isobutylene containing up to 10 weight percent of a conjugated 1,3 diene such as butadiene or isoprene. The isobutylene polymers employed have molecular weights of at least 1,000 and may have molecular weights of 300,000 or even higher. The principal examples of such rubbery isobutylene polymers are the polyisobutylene polymers sold under the trade name "Vistanex" and the interpolymers of isobutylene and isoprene as exemplified by Butyl rubber.

The styrene polymers in which the rubbery isobutylene polymers are incorporated are homopolymers of styrene and interpolymers of styrene containing at least 85 weight percent of styrene. Any comonomer interpolymerized with the styrene will be free of inorganic and other polar substituents and will contain only the elements carbon, hydrogen and some times oxygen. Examples of such comonomers include butadiene and the acrylate and methacrylate esters. All or a part of the styrene may be replaced with its closely related homologues such as alpha-methylstyrene, vinyltoluene, p-ethylstyrene, 2,4 dimethylstyrene, etc.

Only a small quantity of rubbery isobutylene polymer need be incorporated in the styrene polymer to materially accelerate the rate at which the styrene polymer will absorb the volatile aliphatic hydrocarbon when steeped therein. As little as 1 part rubbery isobutylene polymer in 100 parts of styrene polymer materially accelerates the rate of hydrocarbon absorption and there appears to be little advantage in incorporating more than 20 parts of the rubbery isobutylene polymer in 100 parts of the styrene polymer. It is preferred to incorporate from 3 to 15 parts of rubbery isobutylene polymer in 100 parts of the styrene polymer.

The rubbery isobutylene polymer may be incorporated in the styrene polymer in numerous known manners. The simplest method for preparing the polymer mixture comprises preparing a physical admixture of the rubbery isobutylene polymer and styrene polymer and subsequently subjecting the admixed polymers to mechanical work to homogeneously blend them together. Such mechanical working may be carried out on a two-roll rubber mill, in a Banbury mixture, in an extruder or in other types of plastic working apparatuses. Another excellent method for preparing homogeneous polymer compositions involves dissolving the rubbery isobutylene polymer in monomeric styrene and subsequently polymerizing the styrene monomer.

The volatile aliphatic hydrocarbons employed to steep the particles of styrene polymer containing the rubbery isobutylene polymer boil within the range of from about 10° C. to about 80° C. and preferably within the range of from about 30° C. to about 60° C. Examples of such hydrocarbons include pentane, cyclopentane, heptane, petroleum ethers boiling within the previously described temperature ranges, etc. It is permissible, and in some cases desirable, to admix another volatile organic liquid with the aliphatic hydrocarbon. In particular, good results frequently are obtained employing mixtures of volatile aliphatic hydrocarbons and lower halogenated hydrocarbons such as methylene chloride.

The steeping process employed is conventional except for the added material incorporated in the styrene polymer particles. For an optimum rate of hydrocarbon absorption, the styrene polymer particles should be comminuted to a fine particle size, e. g., less than about 10 mesh. In addition, the rate of hydrocarbon absorption is dependent on the temperature which may range from about 0° C. to the boiling point of the hydrocarbon or even higher if the absorption step is carried out under pressure. At room temperature or above sufficient agitation should be provided to prevent agglomeration of the styrene polymer particles. Where the styrene polymer composition is prepared by a suspension polymerization process, the volatile aliphatic hydrocarbon may be added to the polymerization vessel at the end of the polymerization with continued agitation to prepare the foamable styrene polymer particles.

The above descriptions and particularly the examples are set forth by way of illustration only. Many other modifications and variations thereof can be made without departing from the spirit and scope of the invention herein described.

What is claimed is:

1. The method for preparing foamable particles of a styrene polymer which consists of steeping particles of a styrene polymer composition in a liquid aliphatic hydrocarbon boiling within the range of about 10–80° C.; said styrene polymer composition consisting of 100 parts of a styrene polymer having 1–20 parts of a rubbery isobutylene polymer intimately incorporated throughout the styrene polymer; said styrene polymer being selected from the group consisting of (a) a homopolymer of a monomer selected from the group consisting of styrene vinyl toluene, p-ethylstyrene and 2,4-dimethylstyrene, (b) an interpolymer consisting solely of at least 2 monomers selected from the group consisting of styrene, alpha-methylstyrene, vinyl toluene, p-ethylstyrene and 2,4-dimethylstyrene and (c) an interpolymer of at least 85 weight percent of a monomer selected from the group consisting of styrene, alpha-methylstyrene, vinyl toluene, p-ethylstyrene, 2,4-dimethylstyrene and mixtures thereof with up to 15 weight percent of butadiene; said rubbery isobutylene polymer being selected from the group consisting of homopolymers of isobutylene and rubbery interpolymers of at least 90 weight percent isobutylene with up to 10 weight percent of a conjugated 1,3-diene of the group consisting of butadience, isoprene and mixtures thereof; said particles of the styrene polymer composition having an average particle size of less than about 10 mesh.

2. The method of claim 1 in which 3–15 parts of the rubbery isobutylene polymer are intimately incorporated in 100 parts of a styrene homopolymer.

3. The method of claim 2 in which the rubbery isobutylene polymer incorporated in the styrene homopolymer is a homopolymer of isobutylene.

4. The method of claim 2 in which the rubbery isobutylene polymer incorporated in the styrene homopolymer is an interpolymer of at least 90 weight percent of isobutylene with up to 10 weight percent of isoprene.

References Cited in the file of this patent

UNITED STATES PATENTS

| | | |
|---|---|---|
| 2,274,749 | Smyers | Mar. 3, 1942 |
| 2,681,321 | Stastny et al. | June 15, 1954 |
| 2,744,291 | Stastny et al. | May 8, 1956 |
| 2,797,443 | Carson | July 2, 1957 |